G. HORVATH.
VALVE GEAR FOR ENGINES.
APPLICATION FILED AUG. 1, 1907.

948,223.

Patented Feb. 1, 1910.
6 SHEETS—SHEET 3.

Fig. 3.

Witnesses:
A. H. Rabsag,
R. H. Butler.

Inventor:
Geza Horvath,
by his Attorneys.

G. HORVATH.
VALVE GEAR FOR ENGINES.
APPLICATION FILED AUG. 1, 1907.

948,223.

Patented Feb. 1, 1910.
6 SHEETS—SHEET 6.

Witnesses:
A. H. Rabsag,
H. H. Butler

Inventor
Geza Horvath
by H. C. Everett & Co.
Attorneys

UNITED STATES PATENT OFFICE.

GEZA HORVATH, OF WHEELING, WEST VIRGINIA.

VALVE-GEAR FOR ENGINES.

948,223. Specification of Letters Patent. Patented Feb. 1, 1910.

Application filed August 1, 1907. Serial No. 386,549.

*To all whom it may concern:*

Be it known that I, GEZA HORVATH, a subject of the King of Hungary, residing at Wheeling, in the county of Ohio and State of West Virginia, have invented certain new and useful Improvements in Valve-Gears for Engines, of which the following is a specification, reference being had therein to the accompanying drawing.

This invention relates to improvements in valve gears for engines, and more particularly to mechanism for controlling the inlet and exhaust valves therefor.

The invention has for an object to provide a novel and improved construction of controlling means for the inlet and exhaust valves, the movement of the former of said means being regulated by a governor connection for that purpose.

Other and further objects and advantages of the invention will be hereinafter fully set forth and the novel features thereof defined by the appended claims.

In the drawings.

Like numerals refer to like parts in the several views of the drawings.

Referring to Figs. 1, 2, 4 and 7, the piston and valve cylinders are shown as formed integral, although they may be constructed in any desired manner. The piston cylinder comprises a body having one side formed with an enlargement 2, this enlargement being provided with two bores 3 and 4 disposed transversely with respect to the longitudinal axis of the piston cylinder 1. The bores 3 and 4 terminate in flanged ends 5, while the body 1 has its ends formed with apertured flanges 6. The bores 3 and 4 of the enlargement 5 constitute the valve cylinders, each bore being provided with two annular ribs 7 and 8 and each cylinder being provided with seats 9 and 10 at the ends of its bores.

Figure 4:
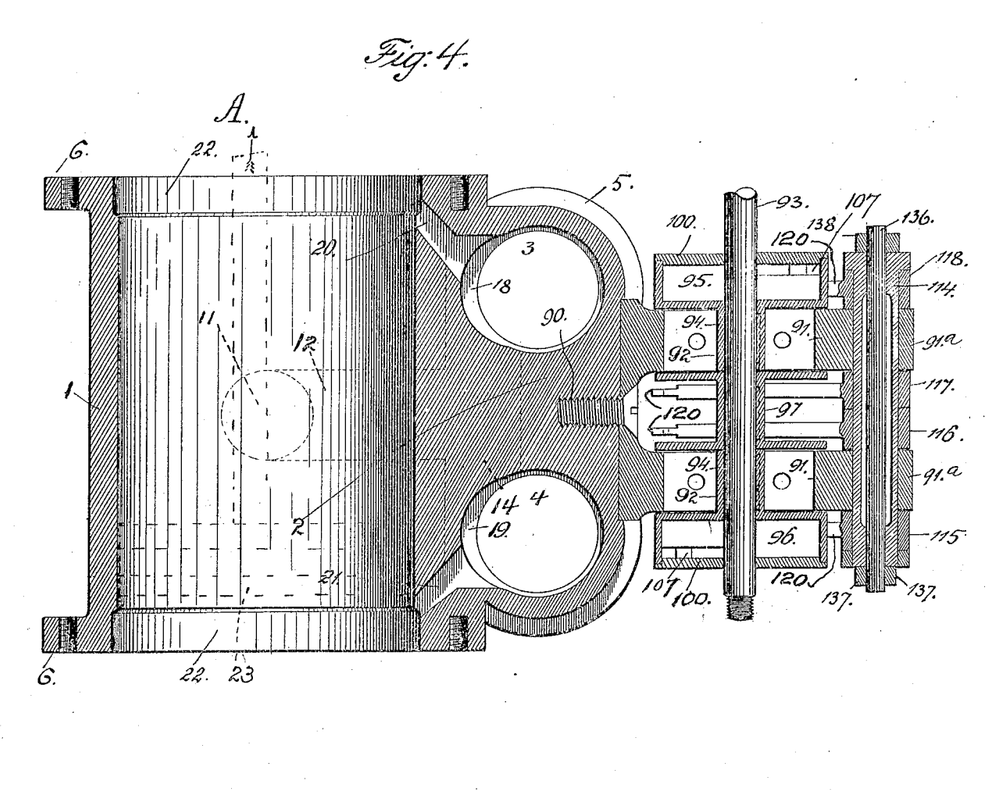
Fig. 4 is a longitudinal horizontal section with parts of the mechanism removed.

The piston cylinder 1 in its upper side is provided with a central steam inlet port 11 communicating with the bores 3 and 4 by a segment shaped passage 12, Fig. 4 and a longitudinally disposed passage 14, this passage extending into the bores 3 and 4 whereby live steam will always have easy access to both of said bores. The lower side of the piston cylinder opposite the steam inlet port 11 is formed with an outlet or exhaust port 15, Fig. 2, communicating with the bores 3 and 4 by a passage 16, and the longitudinally disposed port 17, Fig. 7, this port and the passage 16 being similar to the passage 14 and the passage 12. The passage 14 and port 15 are formed in the enlargement 2 which is provided with recesses 18 and 19 communicating with the piston cylinder by angularly disposed ports 20 and 21, Fig. 4.

The ends of the piston cylinder 1 are trimmed, as at 22, to provide steam chambers defining the limit of the stroke of the piston 23 therein. The rear end of the piston cylinder is closed by a head 24 secured at 25 to the apertured flanges 6 of the cylinder 1. The opposite end of the cylinder 1 is closed by a head 26 similarly secured thereto. This head 26 is provided with a conventional form of stuffing box 27 through which the piston rod 28 operates.

Figures 5, 6, 7:
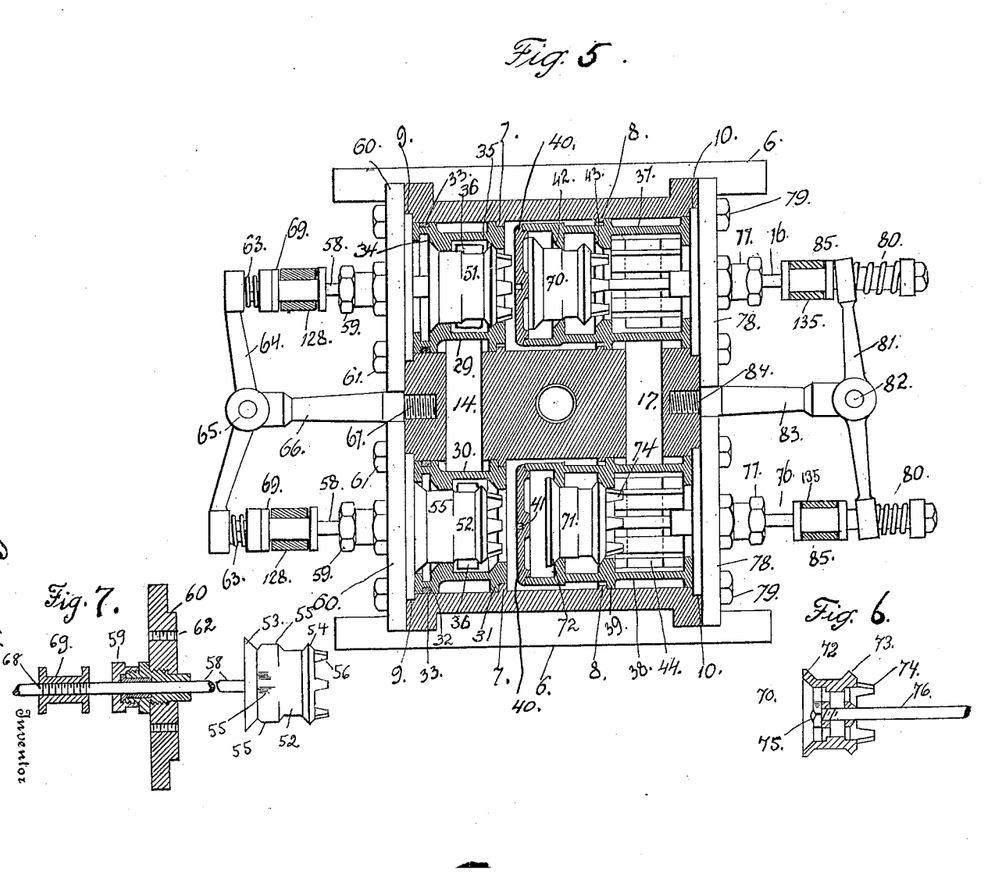
Fig. 5 is a longitudinal section through the valve casing with the valves and operating connections in elevation.
Fig. 6 is a longitudinal section of the exhaust valve.
Fig. 7 is a vertical section through the valve stem hub and cover with the inlet valve in elevation.

In the bores 3 and 4 of the enlargement 2 are arranged valve cages, an inlet valve cage and an exhaust valve cage being located in each bore, Fig. 7. The inlet valve cages 29 and 30 are cylindrical and at their inner ends are provided with peripheral flanges 31 to engage ribs 7, and at the outer ends with peripheral grooves 32 for a packing 33. Each cage is formed interiorly with valve seats 34 and 35, the seat 34 being of greater diameter than the seat 35. Intermediate the seats 34 and 35 each cage is provided with circumferentially arranged openings which establish communication between the interior of the cages and the inlet passage 14.

The exhaust valve cages 37 and 38 are mounted in the opposite ends of the bores 3 and 4, respectively, from those containing the inlet valve cages 29 and 30. The exhaust valve cages are cylindrical and intermediate their ends are formed with peripheral flanges 39 for engaging the ribs 8 of the bores 3 and 4. The inner ends of the cages 37 and 38 are interiorly screw threaded to receive caps 40 notched as at 41 so that a tool can be used for screwing the caps in the ends of the cages. Each cage is formed with interior valve seats 42 and 43. Between the seats and outer end of each cage are a plurality of circumferentially arranged openings 44 establishing communication between the interior of the cages and the outlet port 17 of the bores 3 and 4.

In the inlet valve cages 29 and 30 are movably mounted inlet valves 51 and 52, respectively, these being formed with peripheral beveled flanges 53 and 54 for engaging the valve seats 34 and 35, respectively, of the valve cages. Each valve is formed with peripheral guide ribs 55 and end projections 56 serving to center the valves within their respective cages. Connecting with the valves 51 and 52 are actuating rods 58 extending through stuffing boxes 59 carried by heads 60 adapted to fit the seats 9 of the bores 3 and 4, said heads being secured to the enlargement 2, as at 61. Each head is provided with threaded openings 62, Fig. 7 for screws employed to hold said cages in engagement with the ribs 7 of the bores. Springs 63 are interposed between the outer ends of the rods 58 and the beams 64 fulcrumed at 65 upon the end of a laterally projecting post 66, threaded or otherwise secured, as at 67, in the enlargement 2 of the piston cylinder 1. See Fig. 5.

In the cages 37 and 38 are the outlet or exhaust valves 70 and 71 similar to the inlet valves 51 and 52 having peripheral beveled flanges 72 and 73 and end guide projections 74, the flanges 72 and 73 being adapted to engage the seats 42 and 43 of said cages, Fig. 5.

Connecting with the valves 70 and 71, as at 75, are actuating rods 76, said rods extending through stuffing boxes 77 carried by heads 78 engaging the seats 10 of the enlargement 2. The heads 78 are secured to the enlargement 2, as at 79, and are similar in construction to the heads 60. The actuating rods 76 are connected to a beam 81 pivoted at 82 upon the end of the laterally projecting post 83, which is secured in the enlargement 2, as at 84. These actuating rods 76 also carry hubs 85, and springs 80 bearing on the beam 81.

Secured to the side of the enlargement 2 by a screw or screws 90, Fig. 4, are two brackets 91 which carry the bearings 92 for the shaft 93 and bearings 91ª for sleeve 114.

A longitudinally disposed shaft 93 driven by any suitable connection with the engine carries the sleeves 94 of drums 95 and 96, the sleeves resting in the bearings 92 on brackets 91. A spool 97 is also fixed upon the shaft 93 between said bearings, said spool carrying two sets of circumferentially arranged revoluble rollers 98 and 99, the rollers of each set being oppositely disposed, and one set arranged upon one side of a spool with relation to the other set, as clearly shown in Fig. 12.

Figure 8:
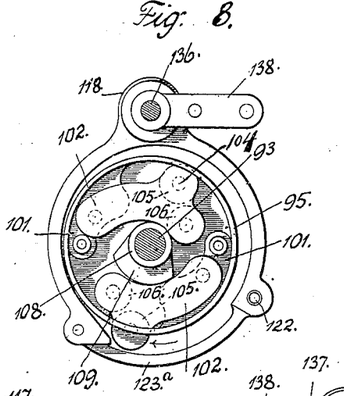
Fig. 8 is a side elevation of the operating mechanism for one inlet valve.
Figure 11:
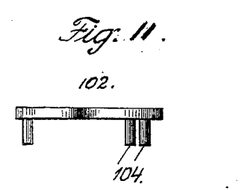
Fig. 11 is an edge view of a roller frame.
Figure 14:
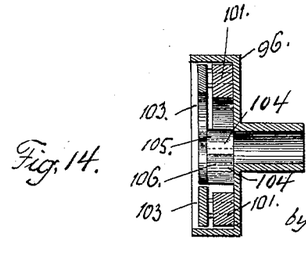
Fig. 14 is a section on the line x—x, Fig. 11.

The drums 95 and 96 are closed by head plates 100, and in each drum are formed diametrically opposed bearings 101, Figs. 8, 11 and 14. Pivotally connected to said bearings are segment shaped roller frames or carriers 102 and 103, the carriers 102 being located in the drum 95 and the carriers 103 located in the drum 96. These carriers are provided with pintles 104 for rollers 105 and 106, the rollers 105 together with the portion of the carriers to which their pintles are secured being adapted to protrude through diametrically opposed slots 107 formed in the drums 95 and 96, Fig. 4.

Loosely mounted upon the shaft 93 in the drums 95 and 96 are sleeves 108 carrying cams 109 and 110 within the drums 95 and 96, respectively. These cams are adapted to engage the rollers 106 of the carriers 102 and 103. The sleeves 108 extend through the head plates 100 and upon their outer ends are provided with adjustable straps 111 and 112 carrying apertured lugs 113 for connection to the governor.

Figure 3:
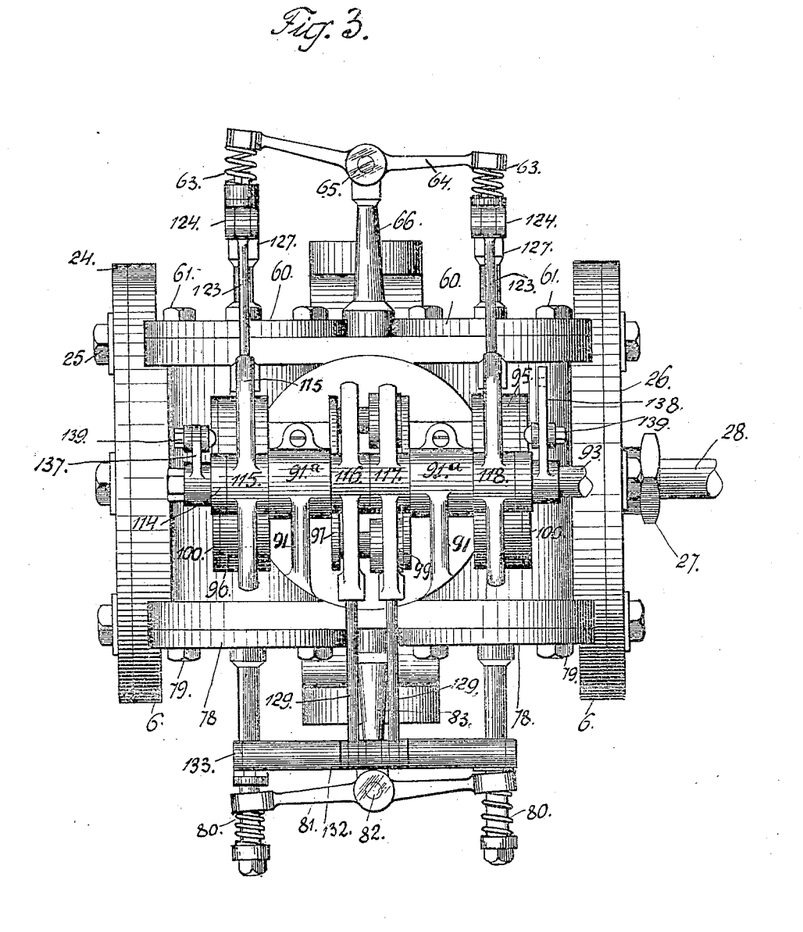
Fig. 3 is a side elevation.

Mounted in the outer ends of the brackets 91 is a sleeve 114, and loosely mounted upon said sleeve are rockers 115, 116, 117 and 118, Fig. 3, the rockers 115 and 118 being located adjacent the drums 95 and 96, respectively and the rockers 116 and 117 are located adjacent the spool 97. Each rocker comprises curved arms partially surrounding the drums 95 and 96 and the spool 97, and connected by links 123ª, Figs. 1, 8 and 9.

The rollers 105 of the drums 95 and 96 are adapted to contact with the arms of the rockers 115 and 118, while the rollers 98 and 99 of the spool 97 are adapted to contact with the arms of the rockers 116 and 117.

Figure 1:
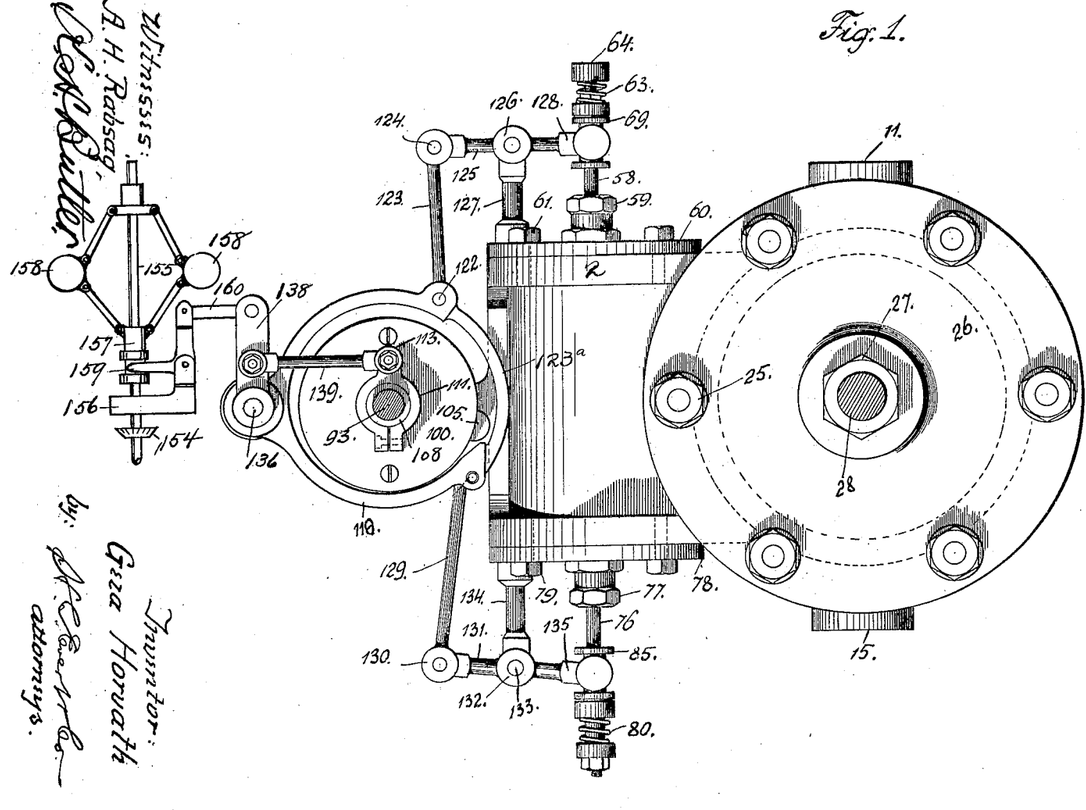
—Figure 1 is a front elevation of the invention with the governor in diagram.
Figure 2:
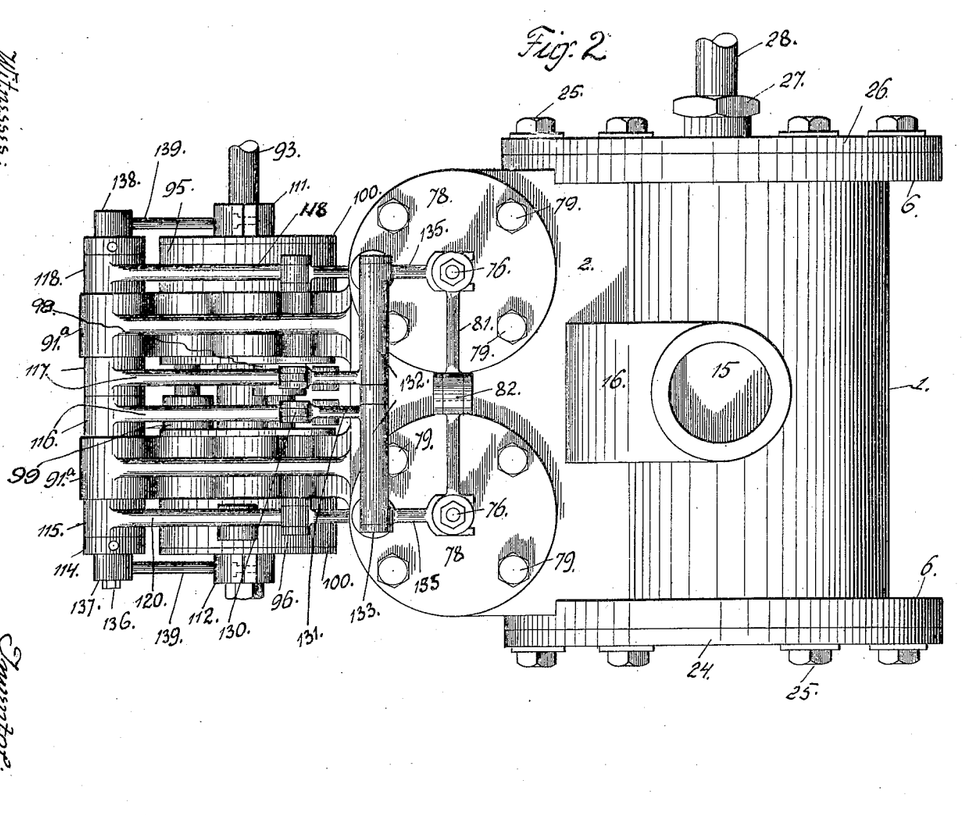
Fig. 2 is a bottom plan thereof.

Attached to the arms of the rockers 115 and 118 at the connection 122 are pitmen 123, said pitmen being connected as at 124, to the rockers 125, Fig. 1, fulcrumed, as at 126, in the outer end of the bracket 127 carried by the enlargement 2 of the piston cylinder 1. The opposite ends of the rockers 125 are bifurcated, as at 128, to engage the hubs 69 adjustably mounted at 68 upon the actuating rods 58 of the inlet valves 51 and 52.

Attached at the connections 121 of the rockers 116 and 117 are pitmen 129, said pitmen being connected as at 130 to the crank arms 131 carried by the sleeves 132 movably mounted upon the shaft 133 fixed in brackets 134, carried by the heads 78 of the enlargement 2. The outer ends of the sleeves 132 carry bifurcated crank arms 135 for engaging the hubs 85 of the outlet valve actuating rods 76.

The governor control consists of the following elements. Passing through the sleeve 114 is a shaft 136 upon the ends of which are fixed crank arms 137 and 138. These arms are connected by pitmen 139 with the apertured lugs 113 of the adjustable straps 111 loosely mounted upon the shaft 93. The crank arm 138 connects with the governor of the engine. The governor shaft 155 is journaled in a suitable bearing 156 and driven by wheel 154 from any engine connection. A conventional form of governor having a movable sleeve 157 and weights 158 is shown, and the centrifugal force of the weights 158 is adapted to elevate the sleeve 157, and through the medium of a bell crank lever 159 oscillate the crank arm 138. The bell crank lever 159 is pivotally mounted upon the bearing 156 and connects with the crank arm 133 by a rod 160. So long as the engine is in operation, a rotary movement will be imparted to the shaft 93 of the valve operating mechanism, and should the engine exceed a predetermined speed, the governor will immediately oscillate the shaft 136.

By reference to Figs. 4 and 5, it will be observed that the live steam can pass from passage 14 through the openings 36 of the cage 30 and enter the bore 4 of the enlargement 2. This admission of the steam to the bore 4 is permitted by the inlet valve 52 being open and the exhaust valve 71 being closed. The live steam can then pass from bore 4 through port 21 in the piston cylinder 1 where it drives the piston head 23 in the direction of the arrow A, Fig. 4. The steam upon the opposite side of the piston then exhausts through port 20 into the central part of the bore 3, and as the valve 51 is closed, and exhaust valve 70 open, the exhaust steam can pass through cage 37 into the outlet port 17, from where it passes through passage 16 to the exhaust port 15. The valve mechanism now shifts the inlet and outlet valves to admit steam through the port 20 and exhaust steam through the port 21. This is accomplished by the shaft 93 imparting a rotary movement to the drums 95 and 96 and the spool 97. The drums 95 and 96 control the operation of the inlet valves 51 and 52, while the spool 97 controls the operation of the outlet valves 70 and 71. As the drums 95 and 96 revolve the roller carriers 102 and 103 are moved out of the drums by the rollers 106 contacting with the cams 109 and 110, loosely mounted upon the shaft 93, and adjustably held through the medium of the shaft 136 and the governor connections. When the rollers 106 of the drums 95 and 96 contact with the cams 109 and 110, the rollers 105 contact with the arms of the rockers 115 and 118, oscillating said rockers, and through the medium of pitmen 123, rockers 125, hubs 69 and actuating rods 58 the inlet valves 51 and 52 are moved.

Figure 9:
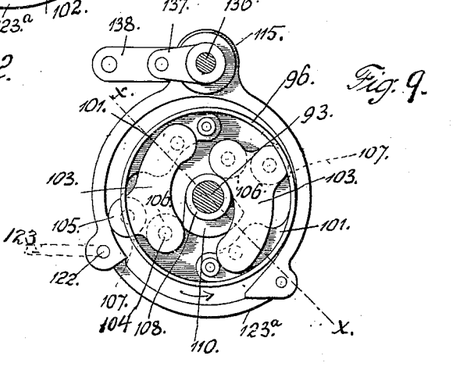
Fig. 9 is a similar view of the operating mechanism for the other inlet valve, showing the frame in position to operate upon the rockers.
Figure 10:
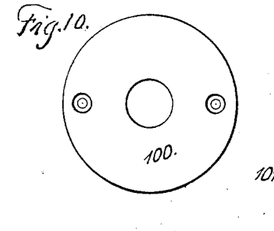
Fig. 10 is an end view of a detached head plate for the valve operating mechanism.
Figure 12:
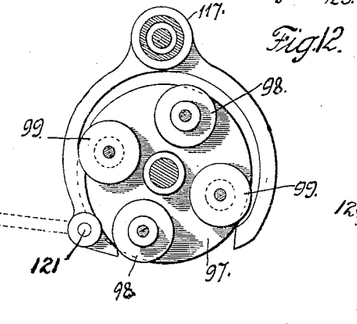
Fig. 12 is an elevation of the exhaust valve controlling mechanism.
Figure 13:
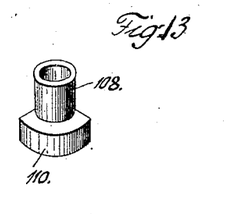
Fig. 13 is a detail perspective of the cam for regulating the inlet valve.

By referring to Figs. 9 and 12, it will be observed that the roller carriers 102 are disposed at right angles to the carriers 103, and that the cams 109 and 110 are disposed to move the roller carriers at the proper time. Since the roller carriers are set at 90 degrees apart, the rockers 115 and 118 will be oscillated in opposite directions, and through the medium of the connections just described and the beam 64 the inlet valves 51 and 52 will be alternately opened and closed. The exhaust valves 70 and 71 are similarly operated. As the spool 97 revolves the rollers 98 oscillate the rocker 117 in one direction, and the rollers 99 oscillate the rocker 116 in the opposite direction, thus alternately reciprocating the pitmen 129 which connect with the arms of the rockers 117 and 116. Should the speed of the engine pass beyond a certain limit the governor immediately moves the shaft 136 through the medium of the crank arm 138. As this crank arm and the arm 137 at the opposite end are connected to the sleeves 108, Fig. 1, said sleeves will be moved sufficiently to place the cams 110 in position to cause the movement of the roller carriers 102 and 103 toward and from the axis of this shaft to occur when the rollers which travel in contact with the rockers 115 and 118 are more nearly in the plane of the axes of the shafts 93 and 136 and consequently the oscillation of the rockers 115 and 118 to be reduced. It is then apparent that a resultant reduction of the travel of the inlet valves 51 and 52 takes place providing a quicker cut off of live steam, reducing the volume of steam entering the piston cylinder and consequently reducing the speed of the engine.

The cut off of steam by the inlet valves 51 and 52 can be regulated at numerous places, for instance, the position of the crank arms 137 and 138 upon the shaft 136, the position of the straps 111 upon the sleeves 108, and the position of the hubs 69 upon the actuating rod 68. However, I preferably regulate the cut off by the straps 111, as easy access can be had to said straps, and they are particularly designed for this purpose.

Attention is called to the fact that the inlet of steam to the piston cylinder can be prolonged to the extent of approximately nine-tenths of the stroke of the cylinder piston, which is considerably greater than in many steam engines.

Having described my invention and set forth its merits, what I claim and desire to secure by Letters Patent is:—

1. An engine embodying a piston cylinder, communicating valve cylinders carried thereby, inlet valves arranged in said cylinders, exhaust valves arranged in said cylinders, a revolving shaft, a governor actuated shaft, rockers movably supported thereon, drums carried by said revolving shaft and carrying means for moving some of said rockers, a spool carried by said revolving shaft and carrying means for moving others of said rockers, connections between some of said rockers and said exhaust valves, connections between others of said rockers and said inlet valves, and means carried within said drums and actuated by said governor shaft for regulating the drum moving means for said rockers.

2. An engine embodying a piston cylinder, communicating valve cylinders carried thereby and provided with inlet valves and exhaust valves therein, a revolving shaft, a governor actuated shaft, pivoted rockers for actuating said exhaust and inlet valves, a rotating member carried by said revolving shaft and provided with radially movable means for moving said inlet valve rockers, relatively stationary cam means engaging said radially movable means, and connections actuated by said governor shaft for rotatably adjusting the cam means for said inlet valve rockers.

3. An engine comprising a piston cylinder, communicating valve cylinders, exhaust valves arranged in said cylinders, inlet valves also arranged in said cylinders, a revolving shaft, movable rockers, pivoted means carried by said revolving shaft for engaging said rockers, means actuated by said rockers for moving said inlet and exhaust valves, and governor actuated means circumferentially movable upon said shaft to vary the action of the pivoted means for moving the rockers.

4. An engine comprising a piston cylinder, valve cylinders carried thereby and communicating with said piston cylinder, inlet valves arranged in said valve cylinders, exhaust valves arranged within said valve cylinders, a revolving shaft, segmental rockers movably supported so as to individually surround said shaft, pivoted radially movable means carried by said shaft within said rockers for engaging the same, means connected with said rockers for moving said exhaust valves and inlet valves, and governor actuated means for varying the movement of the engaging means for said inlet valves.

5. The combination with a piston cylinder, of valve cylinders communicating therewith, inlet valves arranged within said valve cylinders, exhaust valves arranged within said valve cylinders, rockers movably supported from said valve cylinders, revolving drums, means arranged within said drums for engaging some of said rockers, revolving means arranged between said drums for engaging the others of said rockers, connections between said rockers and said exhaust valves and inlet valves, and governor actuated means supported from said valve cylinders for controlling the movement of said drum actuated rockers.

6. The combination with a piston cylinder, valve cylinders communicating therewith, inlet and exhaust valves within said cylinders, a cam, rockers connected with said inlet valves, means controlled by said cam for oscillating said rockers, a spool, spool actuated rockers connected to said exhaust valves, means for simultaneously revolving said cam controlled means and spool, and governor actuated means connected to shift said cam for controlling the movement of the inlet valve.

7. An engine comprising a piston cylinder, a valve cylinder communicating therewith, inlet and exhaust valves arranged within said valve cylinder, a cam, means controlled by said cam for oscillating a rocker, a rocker engaging said means and connected with the inlet valve, a spool rotatable independent of said cam, a spool actuated rocker for moving said exhaust valve, means for simultaneously revolving said cam controlled means and spool, and means connected to shift said cam for varying the movement of its rockers.

8. In an engine, valve cylinders, valves arranged therein, rockers connected to some of said valves for moving the same, a cam, means controlled by said cam for oscillating said rockers, a spool rotatable independent of said cam, spool actuated rockers for moving the other of said valves, means for simultaneously revolving said cam controlled means and spool, and governor actuated means for controlling the movement of said cam actuated rockers.

9. An engine comprising a valve cylinder, valves arranged therein, rockers for moving one of said valves, a revolving shaft, a drum secured thereto, cam controlled means movably mounted upon said drum for actuating said rockers, a roller secured to said shaft, and rockers moved by said roller for actuating the other valve.

10. In a valve gear, a rotating shaft carrying a casing, a carrier pivoted in said casing, a rocker arm disposed in the path of action of said carrier and connected with an engine valve, and a relatively stationary cam mounted on said shaft for actuating said carrier.

11. In a valve gear, a rotating shaft carrying a casing, a carrier pivoted in said casing, a rocker arm disposed in the path of action of said carrier and connected with an engine valve, a relatively stationary cam mounted on said shaft for actuating said carrier, and friction rollers mounted upon said carrier to contact with said rocker arm and cam.

12. In a valve gear, a shaft, a sleeve mounted upon said shaft and provided with a cam, a pivoted carrier mounted upon a rotatable member carried by said shaft to engage said cam, a rocker arm disposed to contact with said carrier, a connection from said arm to a valve, and a governor connection for shifting said sleeve and cam.

13. In a valve gear, a casing, a shaft extending therethrough, a sleeve mounted upon said shaft and provided with a cam, a pivoted carrier mounted in the casing to engage said cam, a rocker arm disposed to contact with said carrier, a connection from said arm to a valve, a rock shaft upon which said rocker is mounted, a lever carried by said rock shaft, and a collar for said sleeve connected to said lever.

14. In a valve gear, a casing, a shaft extending therethrough, a sleeve mounted upon said shaft and provided with a cam, a pivoted carrier mounted in the casing to engage said cam, a rocker arm disposed to contact with said carrier, a connection from said arm to a valve, and a rock shaft upon which said rocker is mounted.

15. In a valve gear, a casing, a shaft extending therethrough, a sleeve mounted upon said shaft and provided with a cam, a pivoted carrier mounted in the casing to engage said cam, a rocker arm disposed to contact with said carrier, a connection from said arm to a valve, a rocker arm, an exhaust valve connection extending from said last mentioned arm, and a rotatable member carried by said shaft and provided with a contact roller to engage said last mentioned rocker arm.

16. In a valve gear, a rotatable member, a shaft extending therethrough, a sleeve mounted upon said shaft and provided with a cam, a carrier pivoted on said member to travel therewith and engage said cam, and a valve actuating rocker arm disposed to contact with said carrier.

17. A valve gear comprising a plurality of valves having extended stems, independently actuated rocking beams for operating said stems, a pivoted beam having its opposite ends disposed in alinement with said valve stems, and an interposed cushioning spring between said pivoted beam and stems.

18. A valve gear comprising a plurality of valves having extended stems, independently actuated rocking beams for operating said stems, a pivoted beam having its opposite ends disposed in alinement with said valve stems, an interposed cushioning spring between said pivoted beam and stems, flanged collars secured to said stems, and a bifurcated connection with said rocking beams disposed within the flanges of said collars.

19. In a valve gear, an exhaust valve actuating means comprising parallel disks having spindles extending between the same, friction rollers mounted upon said spindles, rocker arms partially embracing the space between said disks to engage said rollers, and a valve connection from the free end of one of said rocker arms.

20. In a valve gear, a valve casing having a central cylinder port, inlet and exhaust valves communicating with said port at each side of the casing, a driven shaft provided with rotatable valve controlling devices movable toward and from the axis of said shaft, a series of rocker arms mounted to be engaged by said devices and connected to said valves, and governor controlled means for regulating the movement of the inlet valve controlling device toward and from its rocker arm.

21. In a valve gear, a valve casing having a central cylinder port, inlet and exhaust valves communicating with said port at each side of the casing, a driven shaft provided with rotatable valve actuating devices movable toward and from the axis of said shaft, a series of rocker arms mounted on a common shaft and connected to said valves, a governor connection with said common shaft, a shifting cam for regulating said movement of the inlet valve controlling device, and a connection from said cam to said common shaft.

In testimony whereof I affix my signature in the presence of two witnesses.

GEZA HORVATH.

Witnesses:
JULIUS MOZNI,
A. H. RABSÁG.